US005886696A

United States Patent [19]

Kakko et al.

[11] Patent Number: 5,886,696

[45] Date of Patent: Mar. 23, 1999

[54] DISPLAY APPARATUS AND METHOD DYNAMICALLY INDICATING ELEVATOR MOVEMENT BETWEEN FLOORS BY SCROLLING INFORMATION

[75] Inventors: Markku Kakko, Hyvinkää; Juha Salminen, Helsinki; Asko Juntunen, Hyvinkää, all of Finland

[73] Assignee: Kone Oy, Helsinki, Finland

[21] Appl. No.: 925,076

[22] Filed: Sep. 8, 1997

Related U.S. Application Data

[63] Continuation of Ser. No. 401,674, Mar. 10, 1995, abandoned.

[30] Foreign Application Priority Data

Mar. 15, 1994 [FI] Finland .................................... 941226

[51] Int. Cl.[6] ................................ G06F 3/14; B66B 3/02

[52] U.S. Cl. .......................... 345/341; 345/123; 345/970; 187/399; 187/397

[58] Field of Search .................................... 345/341, 973, 345/970, 965, 121, 123, 124, 125; 706/910, 918; 187/397, 399, 391, 392, 393, 396

[56] References Cited

U.S. PATENT DOCUMENTS

| | | | |
|---|---|---|---|
| 4,814,757 | 3/1989 | Patterson et al. | 345/124 |
| 4,852,696 | 8/1989 | Fukuda et al. | 187/392 |
| 4,958,707 | 9/1990 | Yoneda et al. | 187/391 X |
| 4,989,694 | 2/1991 | Ueshima et la. | 187/396 |
| 4,995,479 | 2/1991 | Jujiwara et al. | 187/397 |
| 5,042,620 | 8/1991 | Yoneda et al. | 187/391 |
| 5,056,629 | 10/1991 | Tsuji et al. | 345/123 |
| 5,194,702 | 3/1993 | Swonger, Jr. | 187/399 |
| 5,196,838 | 3/1993 | Meier et al. | 395/341 |
| 5,289,205 | 2/1994 | Torres | 345/124 |
| 5,477,240 | 12/1995 | Huebner et al. | 345/123 |
| 5,479,600 | 12/1995 | Wroblewski et al. | 395/973 |
| 5,491,781 | 2/1996 | Gasperina | 395/973 |
| 5,495,267 | 2/1996 | Fujitaka | 345/123 |
| 5,528,259 | 6/1996 | Bates et al. | 395/973 |

FOREIGN PATENT DOCUMENTS 2216695 3/1989 United Kingdom .

*Primary Examiner*—Raymond J. Bayerl

[57] ABSTRACT

In a display (202) comprised in an elevator system, more than one floor symbol (205) but less than all the floor symbols corresponding to different floors in the elevator system are highlighted at a time. At least the floor symbol corresponding to the current position and that corresponding to the next floor in the travelling direction is highlighted. The display is preferably so controlled that it scrolls the floor symbols (205) with respect to the car symbol (203). When the elevator car is at a given floor, the floor symbol corresponding to such floor coincides with the car symbol, and when the elevator car moves away from the floor, the floor symbol ceases to coincide with that car symbol, and as the car comes to the next floor, the corresponding floor symbol coincides with that car symbol.

6 Claims, 3 Drawing Sheets

DISPLAY APPARATUS AND METHOD DYNAMICALLY INDICATING ELEVATOR MOVEMENT BETWEEN FLOORS BY SCROLLING INFORMATION

This application is a continuation of application Ser. No. 08/401,674 filed on Mar. 10, 1995, now abandoned.

The present invention relates to a procedure for controlling an elevator display and to an elevator display apparatus.

BACKGROUND OF THE INVENTION

The display devices used in elevator cars and on landings and their operation are subject to many requirements. The displays must be clear and they have to be able to display sufficient information in a visually effective form. They must have a construction permitting direct installation in their physical environment without changes or at most after standard changes.

From the point of view of elevator supply logistics, it would be an advantage if a given type of display device could be used in many types of elevators and for different purposes in the same elevator system. The costs of manufacture and installation of the display device should be reasonable. However, no such display device is available.

A typical display device used in elevator cars and on landings generally indicates the position of the elevator car by means of a floor number or other sign, e.g. a letter symbol. Such a display does not indicate the state or direction of possible motion of the elevator car. However, a mere number or other symbol indicating the floor is not very informative in itself.

There are also display units that show all the stopping floors of the elevator as a series of floor symbols, one of which is highlighted at a time, e.g. by illumining the symbol, to indicate that the elevator car is at the highlighted floor. The motion and travelling direction of the car only become apparent when a new floor symbol is highlighted as the car reaches the floor corresponding to this new floor symbol. Sometimes the direction of motion may be indicated by means of a direction arrow, either a separate one or one comprised in the display. However, a direction arrow only indicates the travelling direction and does not convey an impression of the movement of the elevator. In some cases, message texts and even information about matters unrelated to the elevator system may be displayed.

U.S. Pat. No. 5,194,702 presents a display device which indicates the position of the elevator car with a stationary symbol when the elevator is standing still and in which the symbol indicating the position of the elevator car is scrolled in a vertical direction as the car moves. The symbol is scrolled upwards when the car is ascending and downwards when the car is descending. This creates a visual impression of the car movement and its direction. According to the specification, direction arrows can be displayed by the device. The device can also be used to display other messages. However, the display used in the apparatus has a small height, about equal to the height of a symbol, and is therefore insufficient in respect of visual efficiency. The position of the elevator car is not necessarily revealed to the passenger at a glance. This is the case e.g. when the elevator car is between floors and one symbol has partially moved off the display while the symbol representing the next floor is not yet completely displayed.

It can also be stated that the scrolling of character strings such as texts in a display is known in itself.

SUMMARY OF THE INVENTION

To provide a solution to the needs and problems described above, a new procedure for controlling a display and a new display apparatus are presented as an invention. The procedure of the invention, and the display apparatus of the invention are characterized by what is presented below as are other embodiments of the invention.

The advantages achieved by the invention include:

The displays in elevator cars and on landings are clear and visually effective.

The car and landing displays are of a compact size as it is not necessary to effect all floor symbols simultaneously.

The same display solution is applicable for use in buildings of any size and a single hardware version can be used to effectively all the required symbols regardless of the height of the building.

A passenger in an elevator car can easily estimate the progress of his/her ride by the car display, so he/she can more easily anticipate the arrival of the elevator at his/her destination floor.

The visual clarity of the car display reduces the likelihood of an absent-minded passenger leaving the car at the wrong floor.

A passenger waiting on a landing is given clear and effective information about the movements of the elevator which is to serve the landing call.

In an elevator system consisting of more than one elevator, the passenger can thus know which one of the elevators is going to serve him/her, and clear information provided at the landing helps passengers gather at the right elevator, thus enabling the elevator to depart from the floor sooner, and this again can be utilized in the elevator system in the form of increased transport capacity.

the same display device can be used both as a car display and as a landing display.

The invention is preferably applied in practice by using a display unit having a display consisting of one or more two-color or multi-color LED dot matrix display modules.

This type of display can be used to display messages as well, either in addition to or instead of the information representing the position and state of the elevator car.

BRIEF DESCRIPTION OF THE DRAWINGS

In the following, the invention is described in detail by the aid of a few examples of its embodiments by referring to the attached drawings, in which.

DETAILED DESCRIPTION OF THE EMBODIMENTS

Figure 1A:
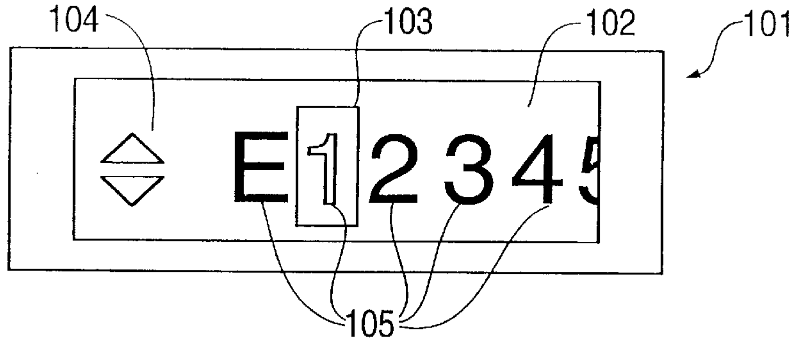
FIGS. 1*a*–1*e* present a display unit in which the floor symbols are scrolled in relation to a car symbol remaining stationary on the display.

FIGS. 1*a*–1*e* show a display unit in which the invention is applied. The display 102 of the display unit 101 displays a car symbol 103, a direction arrow configuration 104 and floor symbols 105. The floor symbol is usually the number of the floor 1,2,3 . . . or a letter or a combination of a number and a letter. However, the invention also allows the use of other kinds of floor symbols that the display may be able to produce. FIG. 1*a* shows the display 102 of the display unit

Figure 1B:
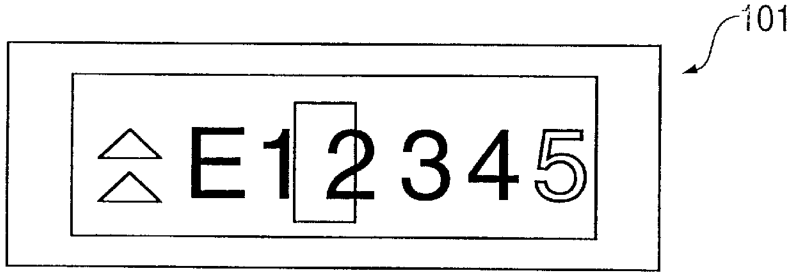
Figure 1C:
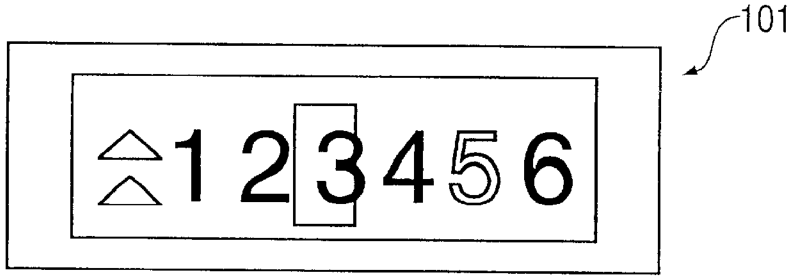
Figure 1D:
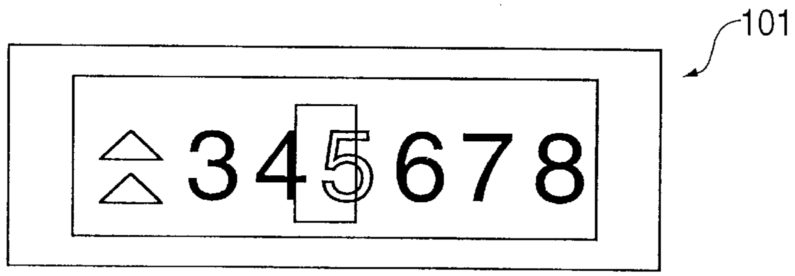
Figure 1E:
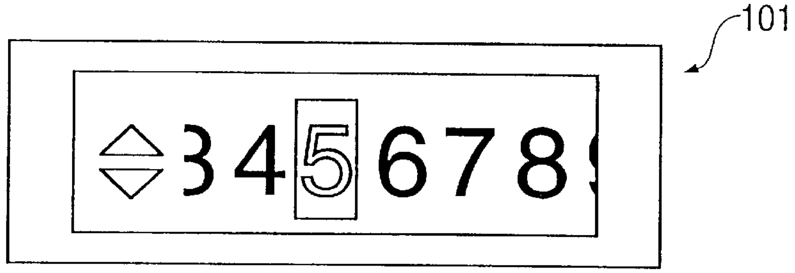

101 in a situation where the elevator has stopped at floor 1, the corresponding floor symbol being highlighted by displaying it intensely illumined. The highlighting can also be effected by any other method compatible with the display unit, e.g. by presenting the floor symbol in a different color than other floor symbols or by making it blink. The direction arrow configuration 104 indicates by means of two stylized arrow head symbols that the elevator is ready to move upwards or downwards as desired. In FIG. 1*b*, the elevator has departed towards floor 5, as indicated by the highlight. The direction arrow symbol indicates with two arrow heads pointing upwards that the elevator is moving in the up direction. The floors in the travelling direction of the elevator at which the elevator has been ordered to stop on the basis of a car call or a landing call are indicated in the display unit 101 by highlighted floor symbols 105. As the elevator advances towards the destination floor, the floor symbols 105 are scrolled in the display 102 in such a way that the floor symbols 105 displayed at each instant move with respect to the car symbol 103 so that, when the elevator car is at a floor, the floor symbol corresponding to that floor coincides with the car symbol, and when the elevator car moves away from the floor, the floor symbol caases to coincide with that car symbol 103, and, similarly, when the elevator car comes to the next floor, the floor symbol 105 corresponding to that floor goes coincides with the next car symbol 103. FIGS. 1*c* and 1*d* show further how the advance of the elevator car is visualized by the display 102. More floor symbols corresponding to floors in the travelling direction of the elevator are scrolled into the display while floor symbols in the rearward direction are scrolled off the display. Finally, the floor symbol (5) of the destination floor is displayed coincides with the car symbol 103. The elevator has stopped at this floor and there are no calls addressed to it, and this is indicated by means of the direction arrow symbols by forming the direction arrow configuration from arrow heads pointing upwards and downwards.

Figure 2A:
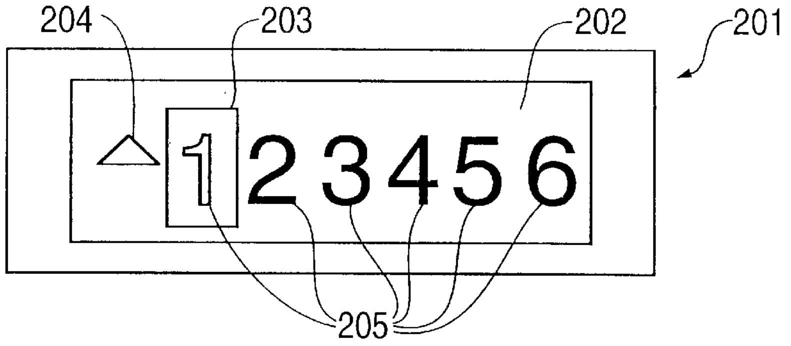
FIGS. 2*a*–2*e* present a display unit in which the floor symbols are scrolled in relation to a car symbol moving on the display.
Figure 2B:
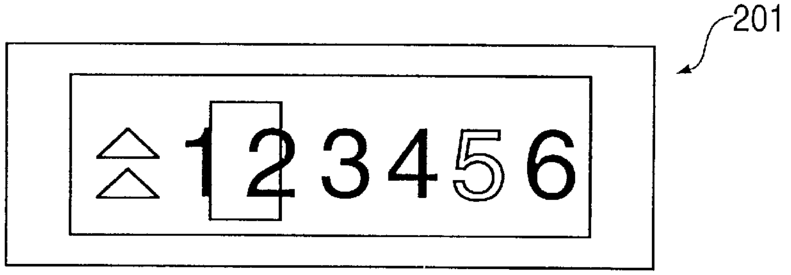
Figure 2C:
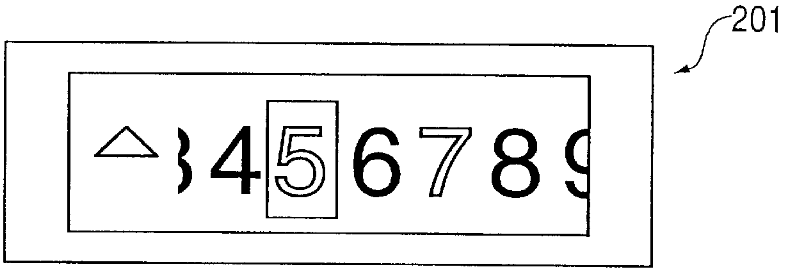
Figure 2D:
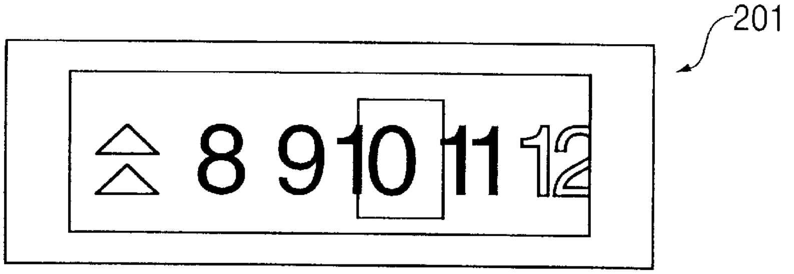
Figure 2E:
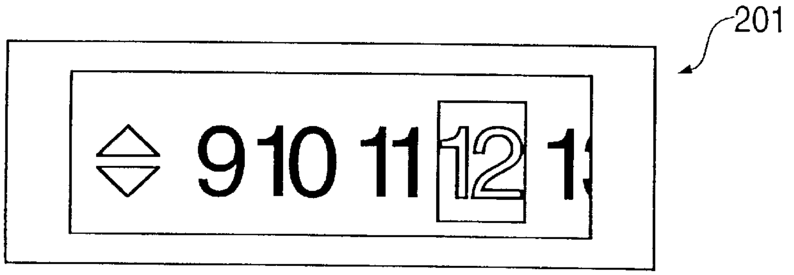

FIGS. 2*a*–2*e* present a display unit in which the invention is applied in a manner differing from the application in FIGS. 1*a*–1*e*. The display 202 of the display unit 201 displays a car symbol 203, a direction arrow 204 and floor symbols 205. The floor symbol is usually the number of the floor 1,2,3 . . . or a letter or a combination of a number and a letter. However, the invention also allows the use of other kinds of floor symbols. FIG. 2*a* shows the display 202 in a situation where the elevator has stopped at floor 1, the corresponding floor symbol being highlighted by displaying it intensely illumined. The highlighting can also be effected by some other method. The direction arrow symbol 204 indicates by means of one stylized arrow head symbol that the elevator can only depart in the up direction. In FIG. 2*b*, the elevator has departed towards floor 5, as indicated by the highlight. The direction arrow symbol indicates with two arrow heads pointing upwards that the elevator is moving in the up direction. In FIGS. 2*b*–2*d*, the floors in the travelling direction of the elevator at which the elevator has been ordered to stop on the basis of a car call or a landing call are indicated in the display unit by highlighted floor symbols. As the elevator advances towards the destination floor, the floor symbols 205 are scrolled in the display 202 in such a way that the floor symbols 205 displayed at each instant change with respect to the car symbol 203 so that, when the elevator car is at a floor, the floor symbol corresponding to that floor is coincides with the car symbol, and when the elevator car moves away from the floor, the floor symbol ceases to coincide with that car symbol 203, and, similarly, when the elevator car comes to the next floor, the floor symbol 205 corresponding to that floor coincides with the car symbol 203. Simultaneously with the scrolling, the car symbol 203 is moved in the display. The movement of the car symbol 203 in the display occurs in a direction opposite to that of the floor symbols 205. The movement of the car symbol 203 represents the movement of the elevator between its extreme positions in an analogous fashion, in other words, when the elevator is in its low position, the car symbol in the display is in a position corresponding to the low position, and when the elevator is in its high position, the car symbol in the display is in a position corresponding to the high position. These display positions corresponding to the low and high positions are located at opposite ends of the display area reserved for the floor symbols. In a preferable embodiment, especially when the display is placed in an upright position, the motion of the car symbol in the display produces a very strong impression of the motion of the elevator car. FIGS. 2*c* and 2*d* further show how the advance of the elevator is visually represented in the display 202. In the case of FIG. 2*c*, the elevator has stopped at floor 5, but it has already been reserved to serve a call to floor 7. In FIG. 2*e*, the elevator has stopped at floor 12 and has no calls assigned to it, corresponding to the case of the elevator in FIG. 1*a* at floor 1.

FIGS. 1*b*–1*e* and 2*b*–2*e* do not show all the reference numbers and for their part reference is made to FIGS. 1*a* and 2*a*, in which the corresponding reference numbers are used to indicate the parts referred to.

According to the invention, the display unit may additionally contain e.g. the following functions:

In a landing display, emphasized highlighting of the floor in question by using a different color or a blinking symbol. If the highlighting is performed when the elevator is approaching and is going to stop at the particular floor, the display can give the passenger clear advance information about the arrival of the elevator.

In a car display, emphasized highlighting of the floors at which the elevator is to stop on the basis of effective calls, by using a different color or a blinking symbol.

A preferred car symbol is one that imparts a clear image of the elevator car. In the figures attached to the present description, the car symbol is given as a rectangular frame of a size sufficient to surround one floor symbol at a times However, other types of floor symbol can be used, e.g. a full rectangle or a circular pattern. Typically, the display has room for 2–3 floor symbols at a time on either side of the car symbol, which is sufficient to produce an impression of the car symbol moving in relation to the floor symbols and thereby a clear image of the position of the elevator. An impression of motion could be produced by simpler means, even by displaying only the current floor and the next one in the travelling direction, but the aim of achieving a strong and visually effective impression of motion as well as the need to display the destination floor at least two floors in advance are arguments in favor of displaying more than two floors at a time.

Figure 3:
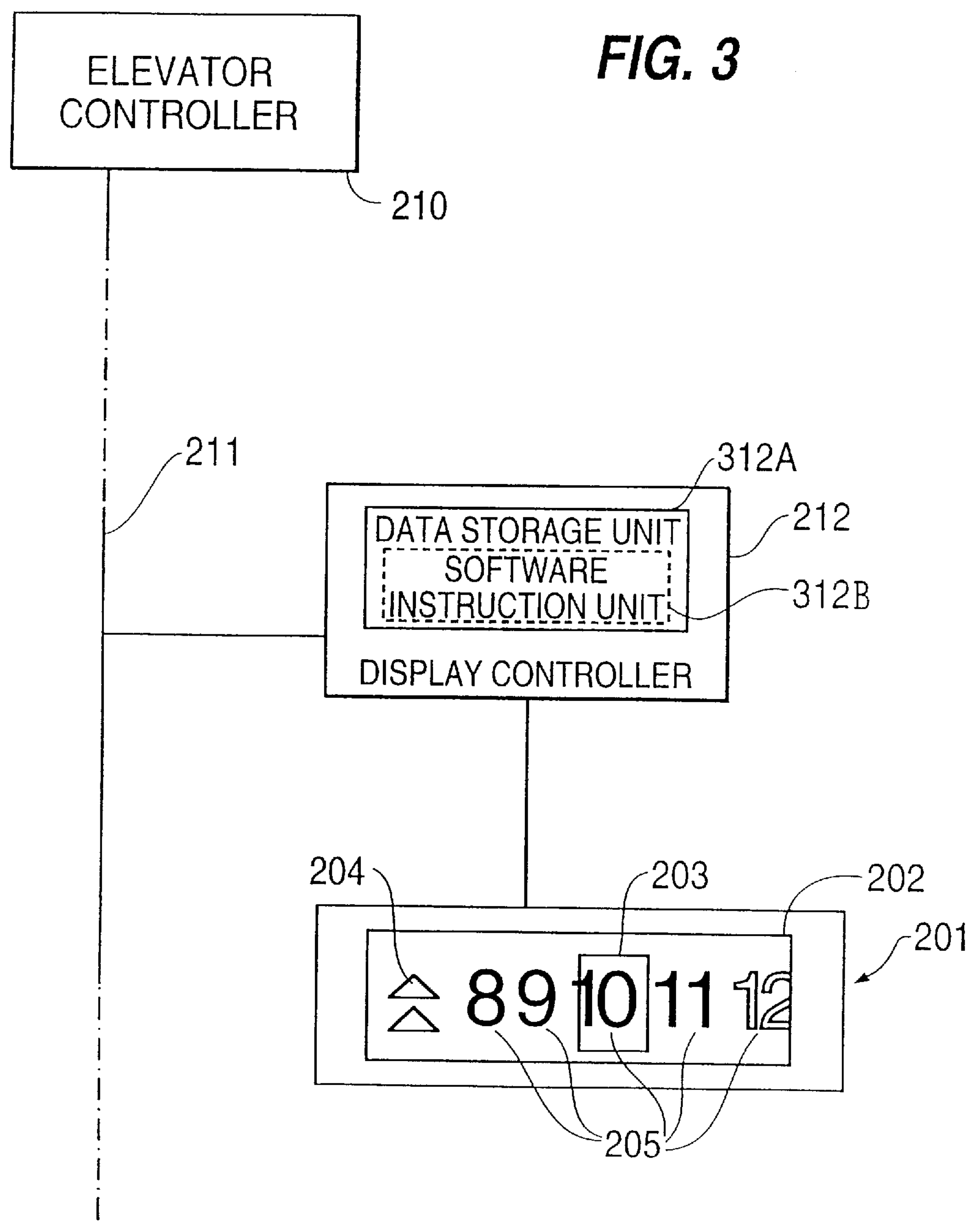
FIG. 3 presents a diagram showing a display apparatus as a part of an elevator system.

FIG. 3 presents a diagram showing the connections between the display unit and the control system of the elevator. The devices under the elevator controller 210 are interconnected via a serial communication bus 211. From the serial bus, the display controller 212 receives information about the motional state of the elevator and the calls assigned to it. The display unit 201 is connected to the display controller 212 and is preferably structurally integrated with the latter. Other information, too, can be transmitted via the serial bus and displayed by the display unit 201. On the basis of the data received from the serial bus, information representing the movements of the elevator and the calls are presented in the display 202. The symbols 203,204,205 displayed are contained in a data storage 312 provided in conjunction with the controller 212. The storage may contain a variety of more symbols than just those intended to be displayed or it may contain instructions for forming the symbols, and the symbols to be displayed are selected from this variety e.g. by software on the basis of instructions from a software instruction unit 312 B in the elevator control system or e.g. in connection with installation by setting the parameters, which may include the number of floors and the symbol reserved for each floor. The controller controls the movement in the display of the sequence of floor symbols corresponding to successive floors in relation to the car symbol in such a way that the position of the car symbol relative to the floor symbols at any given instant corresponds to the position of the elevator car in relation to the floors or at least to the possible stopping positions of the elevator, giving a substantially clear visual image of the car position. The controller preferably also controls the movement of the car symbol in the display so that the movement of the car symbol between its extreme positions corresponds to the movement of the elevator car between its extreme stopping positions.

It is obvious to a person skilled in the art that different embodiments of the invention are not restricted to the examples described above, but that they may instead be varied within the scope of the following claims.

We claim:

1. A procedure for controlling a display of a display unit for an elevator car of an elevator system, said display being used to display a plurality of floor symbols corresponding to different floors in the elevator system, comprising the steps of:

the display simultaneously presenting more than one floor symbol but less than all the floor symbols corresponding to different floors in the elevator system, and the display displaying at least the floor symbols corresponding to a current position of the elevator car and a next floor in a travelling direction of the elevator car, each of the floor symbols corresponding to the current position and the next floor being presented substantially in its entirety.

2. The procedure according to claim 1, wherein the presenting step includes scrolling the floor symbols presented in the display with respect to a car symbol such that, when the elevator car is at a first given floor, the floor symbol corresponding to the first given floor coincides with the car symbol and when the elevator car moves away from the first given floor, the floor symbol corresponding to the first given floor ceases to coincide with the car symbol and, correspondingly, as the elevator car comes to a second given floor, the floor symbol corresponding to the second given floor coincides with the car symbol.

3. The procedure according to claim 2, wherein the car symbol is held stationary with respect to the display.

4. The procedure according to claim 2, wherein the display contains a specific display position corresponding to each position of the elevator car in an elevator shaft and that an instantaneous position of the elevator in the elevator shaft is indicated by showing the car symbol in the display at a specific display position corresponding to the instantaneous car position.

5. A display apparatus, for use with an elevator controller, to indicate the position of an elevator car, comprising a display unit, said display unit having a display, and a display controller for being controlling the operation of said display unit, said display controller including a data storage unit having a plurality of symbols, including a first plurality of floor symbols and an elevator car symbol, said plurality of display symbols being displayable by the display or a software instructions unit needed to produce said plurality of symbols, said display controller connectable to the elevator controller, wherein the display displays more than one of the plurality of floor symbols at a time and the more than one floor symbol move in relation to the car symbol, each of at least two of the first plurality of floor symbols, but less than all of the first plurality of floor symbols, being simultaneously presented substantially in its entirety.

6. The display apparatus according to claim 5, wherein the car symbol is caused to move in relation to the display.

* * * * *